United States Patent
Kim et al.

(10) Patent No.: US 10,684,396 B2
(45) Date of Patent: Jun. 16, 2020

(54) PROTECTIVE COVER AND DISPLAY DEVICE INCLUDING THE SAME

(71) Applicant: Samsung Display Co., Ltd., Yongin-si, Gyeonggi-do (KR)

(72) Inventors: Ji Yeon Kim, Yongin-si (KR); Seong Jin Hwang, Yongin-si (KR); Myung Hwan Kim, Yongin-si (KR); Ik Hyung Park, Yongin-si (KR); Dae Ho Yoon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 287 days.

(21) Appl. No.: 15/802,240

(22) Filed: Nov. 2, 2017

(65) Prior Publication Data

US 2018/0136371 A1  May 17, 2018

(30) Foreign Application Priority Data

Nov. 11, 2016  (KR) .......................... 10-2016-0150017

(51) Int. Cl.
*G02B 1/14* (2015.01)
*B32B 17/06* (2006.01)
(Continued)

(52) U.S. Cl.
CPC ................ *G02B 1/14* (2015.01); *B32B 3/085* (2013.01); *B32B 17/06* (2013.01);
(Continued)

(58) Field of Classification Search
CPC .. G02B 1/14; G02B 1/18; B32B 3/085; B32B 17/06; B32B 37/1284; B32B 2037/243;
(Continued)

(56) References Cited

U.S. PATENT DOCUMENTS

2011/0027514 A1\* 2/2011 Matsushita ............... B32B 7/06
428/41.8
2014/0106150 A1  4/2014 Decker et al.
(Continued)

FOREIGN PATENT DOCUMENTS

KR  10-1323600  11/2013
KR  10-1484452  2/2015
(Continued)

OTHER PUBLICATIONS

Hu, J., et al., "Flexible integrated photonics: where materials, mechanics and optics meet [Invited]", Optical Materials Express, 2013, pp. 1313-1331, vol. 3, Issue 9.
(Continued)

*Primary Examiner* — Nancy R Johnson
(74) *Attorney, Agent, or Firm* — Lewis Roca Rothgerber Christie LLP

(57) ABSTRACT

A protective cover includes a cover substrate, an anti-scattering coating layer on the cover substrate, and an adhesive layer on the anti-scattering coating layer, wherein the anti-scattering coating layer has a plurality of protrusions, wherein the cover substrate has a thickness of 10 μm to 150 μm, and wherein the cover substrate and the anti-scattering coating layer are configured to be folded with a curvature radius of 10 mm or less.

5 Claims, 4 Drawing Sheets

(51) Int. Cl.

| | | |
|---|---|---|
| *B32B 3/08* | (2006.01) | |
| *B32B 37/12* | (2006.01) | |
| *C03C 17/28* | (2006.01) | |
| *G02F 1/1333* | (2006.01) | |
| *G06F 3/044* | (2006.01) | |
| *C03C 17/34* | (2006.01) | |
| *G06F 1/16* | (2006.01) | |
| *G02F 1/1335* | (2006.01) | |
| *B32B 37/24* | (2006.01) | |

(52) U.S. Cl.
CPC .......... *B32B 37/1284* (2013.01); *C03C 17/28* (2013.01); *C03C 17/3405* (2013.01); *G02F 1/13338* (2013.01); *G02F 1/133502* (2013.01); *G06F 1/1603* (2013.01); *G06F 3/044* (2013.01); *B32B 2037/243* (2013.01); *B32B 2315/08* (2013.01); *B32B 2457/20* (2013.01); *B32B 2457/206* (2013.01); *C03C 2217/78* (2013.01); *G02F 2201/50* (2013.01); *G02F 2202/28* (2013.01); *G06F 2200/1633* (2013.01); *G06F 2200/1634* (2013.01)

(58) Field of Classification Search
CPC ............ B32B 2315/08; B32B 2457/20; B32B 2457/206; C03C 17/28; C03C 2217/78; C03C 17/3405; G02F 1/13338; G02F 2201/50; G02F 2202/28; G02F 1/133502; G06F 3/044; G06F 2200/1633; G06F 2200/1634; G06F 1/1603; G06F 1/1641; G06F 1/1652; G06F 9/301

See application file for complete search history.

(56) References Cited

U.S. PATENT DOCUMENTS

| | | | |
|---|---|---|---|
| 2015/0266272 A1 | 9/2015 | Lee et al. | |
| 2016/0009593 A1 | 1/2016 | Brychell et al. | |
| 2017/0338437 A1* | 11/2017 | Watabe | H01L 51/5036 |
| 2018/0061893 A1* | 3/2018 | Breedlove | G06F 1/1652 |

FOREIGN PATENT DOCUMENTS

| | | |
|---|---|---|
| KR | 10-2015-0051459 | 5/2015 |
| KR | 10-20150071706 | 6/2015 |
| KR | 10-2015-0108991 | 10/2015 |
| KR | 10-20160022801 | 3/2016 |

OTHER PUBLICATIONS

Tandon, Rajan, et al., "Controlling the Fragmentation Behavior of Stressed Glass", Fracture Mechanics of Ceramics, 2005, pp. 77-91, vol. 14, Albuquerque, NM.

Varshneya, Arun K., et al., "Chemical Strengthening of Glass: Lessons Learned and Yet to Be Learned", Intern. J. Applied Glass Science, 2010, pp. 131-142, vol. 1, Issue 2.

* cited by examiner

PROTECTIVE COVER AND DISPLAY DEVICE INCLUDING THE SAME

CROSS-REFERENCE TO RELATED APPLICATION

This application claims priority to, and the benefit of, Korean Patent Application No. 10-2016-0150017, filed in the Korean Intellectual Property Office on Nov. 11, 2016, the entire content of which is incorporated herein by reference.

BACKGROUND

1. Field

Aspects of the present invention relate to a protective cover and a display device including the same.

2. Description of the Related Art

Recently, flexible display devices using flat panel displays have been developed. The flat panel displays generally include liquid crystal displays (LCDs), organic light emitting diodes (OLEDs), and electrophoretic displays (EPDs), and the like.

Because flexible display devices have a bending and folding property, they may be folded or rolled, thereby enabling a portable large screen. These flexible display devices may be utilized in various fields such as not only mobile devices, for example, mobile phones, portable multimedia players (PMPs), navigation devices, ultra-mobile PCs (UMPCs), electronic books, electronic newspapers, but also TVs and monitors, and the like.

SUMMARY

Aspects of embodiments of the present invention are directed toward a protective cover having excellent (e.g., high) impact resistance and reliability and a display device including the same.

According to an exemplary embodiment of the present invention, there is provided a protective cover including: a cover substrate; an anti-scattering coating layer on the cover substrate; and an adhesive layer on the anti-scattering coating layer, wherein the anti-scattering coating layer has a plurality of protrusions, wherein the cover substrate has a thickness of 10 μm to 150 μm, and wherein the cover substrate and the anti-scattering coating layer are configured to be folded with a curvature radius of 10 mm or less.

In an embodiment, the anti-scattering coating layer includes a flat portion, and each of the plurality of protrusions protrudes from the flat portion and is integrated with the flat portion to not separate from the flat portion.

In an embodiment, two protrusions of the plurality of protrusions that are adjacent to each other are separated by a first distance.

In an embodiment, the first distance is 5 μm to 100 μm.

In an embodiment, each of the protrusions has an area of 12 $\mu m^2$ to 10,000 $\mu m^2$ on a plane.

In an embodiment, a height of each of the plurality of protrusions is 5 μm to 50 μm.

In an embodiment, the protective cover is configured such that when a pen of 5.7 g is dropped, a drop height of the pen causing the protective cover to be broken is 10 cm or more.

In an embodiment, the plurality of protrusions are between the anti-scattering coating layer and the adhesive layer.

In an embodiment, the adhesive layer fills a space between the adjacent protrusions.

In an embodiment, refractive indices of the cover substrate, the anti-scattering coating layer, and the adhesive layer differ by less than 0.3 from each other.

In an embodiment, a transmittance of the protective cover is 90% or more.

In an embodiment, the protrusions numbered 25 to 10,000 per 1 $mm^2$ of the anti-scattering coating layer.

In an embodiment, the cover substrate and the anti-scattering coating layer have flexibility.

In an embodiment, the anti-scattering coating layer is formed of at least one selected from group consisting of an epoxy acrylate resin, a polyester acrylate resin, a polyether acrylate resin, a urethane acrylate resin, an acryl acrylate resin, an unsaturated polyester, a urethane resin, an acrylonitrile-butadiene-styrene (ABS) resin, and rubber.

In an embodiment, the cover substrate includes glass, the glass including an ion-exchanged chemical strengthening layer.

According to an exemplary embodiment of the present invention, there is provided a display device including: a display panel configured to display an image; and a protective cover on the display panel, wherein the protective cover includes: a cover substrate; an anti-scattering coating layer on the cover substrate; and an adhesive layer on the anti-scattering coating layer, wherein the anti-scattering coating layer has a plurality of protrusions, wherein the cover substrate has a thickness of 10 μm to 150 μm, and wherein the cover substrate and the anti-scattering coating layer are configured to be folded with a curvature radius of 10 mm or less.

In an embodiment, the display device further includes: an adhesive layer between the anti-scattering coating layer and a second electrode.

In an embodiment, the display device has flexibility.

In an embodiment, each of the protrusions has an area of 12 $\mu m^2$ to 10,000 $\mu m^2$ on a plane.

In an embodiment, the protrusions numbered 25 to 10,000 per 1 $mm^2$ of the anti-scattering coating layer.

According to an exemplary embodiment of the present invention, a protective cover may have excellent (e.g., high) durability and may secure a safety of a user.

The protective cover may have flexibility, improve (e.g., increase) impact resistance, and prevent or substantially prevent glass from scattering.

However, the effects of the present invention are not limited to the above-described effects, and may be variously extended without departing from the spirit and scope of the present invention.

BRIEF DESCRIPTION OF THE DRAWINGS

The above and other features and aspects of the invention will be made more apparent by the following detailed description of example embodiments thereof with reference to the attached drawings.

DETAILED DESCRIPTION

Figure 1:
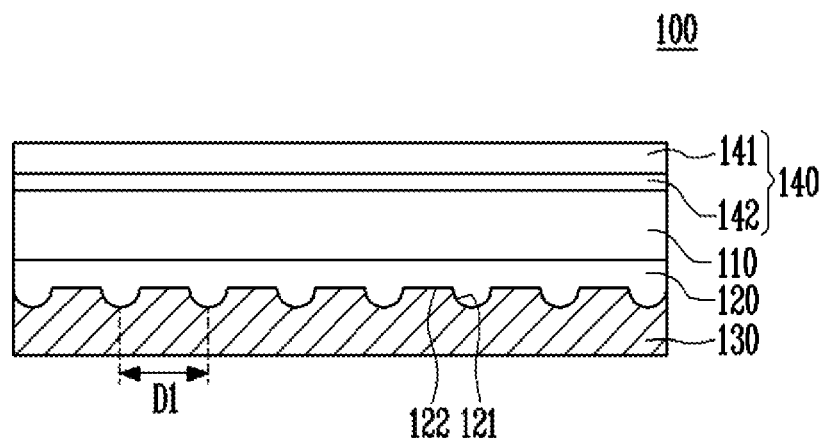
FIG. 1 is a cross-sectional view of a protective cover according to an exemplary embodiment of the present invention.

It will be apparent to those skilled in the art that various modifications and variations can be made in the present disclosure without departing from the spirit or scope of the disclosure, and specific exemplary embodiments are exemplified in the drawings and explained in the detailed description. Thus, it is intended that the present invention covers the modifications and variations of this invention provided they come within the scope of the present invention as defined by the claims and their equivalents.

Like reference numerals designate like elements throughout the specification. In the accompanying drawings, dimensions of structures may be exaggerated for clarity.

FIG. 1 is a cross-sectional view of a protective cover according to an exemplary embodiment of the present invention.

Referring to FIG. 1, a protective cover 100 according to an exemplary embodiment of the present invention includes a cover substrate 110 and an anti-scattering coating layer 120 provided on one side of the cover substrate 110. In addition, referring to FIG. 1, an adhesive layer 130 is provided on the anti-scattering coating layer 120.

An auxiliary sheet 140 is provided on the other side of the cover substrate 110. The protective cover 100 may protect the display device 10 from an external impact. At this time, the external impact may be an impact scratching the protective cover 100, a surface impact, a point impact, or the like. A point impact refers to the application of high pressure to a small area, and a surface impact refers to the application of high pressure to a relatively large area. For example, the point impact may occur when the display device 10 is pressed by a sharp object, such as a pen. In addition, the surface impact may occur when the display device 10 is pressed by a heavy object, for example, during a transportation process. The protective cover 100 may be particularly susceptible to the point impact. For example, when the display device 10 is pressed by a sharp object, the protective cover 100 may be broken if the protective cover 100 is subjected to an impact that it cannot withstand. At this time, fragments generated by the breakage of the protective cover 100 may harm the user as well as the display device 10. Therefore, it is desirable to take measures to prevent the fragments of the protective cover 100 from scattering.

The protective cover 100 may have various shapes in a plane view. For example, the protective cover 100 may have a shape such as a rectangle, a square, a circle, an ellipse, a semicircle, a semi-ellipse, and the like.

The cover substrate 110 may form a skeleton of the protective cover 100. Accordingly, the cover substrate 110 may have a shape such as a rectangle, a square, a circle, an ellipse, a semicircle, a semi-ellipse, or the like, depending on the shape of the protective cover 100.

The cover substrate 110 may be made of at least one of glass, aluminosilicate, borosilicate, and boroaluminosilicate. However, a material of the cover substrate 110 is not limited to the above listed material. The cover substrate 110 may be made of a material suitable for the cover substrate 110 because it has good durability, surface smoothness, and transparency, in addition to the material listed above.

The cover substrate 110 has flexibility and may have a thickness of about 10 μm to about 150 μm. When the thickness of the cover substrate 110 is greater than about 150 μm, the repulsive force against deformation becomes excessively large, such that the cover substrate 110 and the protective cover 100 may be difficult to bend. In addition, when the thickness of the cover substrate 110 is less than 10 μm, the cover substrate 110 may have a low strength, such that the cover substrate 110 may be damaged. Here, "damaged" refers to the state when the cover substrate 110 disclosed in the present invention may no longer be usable for the intended purpose, such as when broken, flaws or cracks are formed, flaws or cracks are propagated, or when fractured.

The cover substrate 110 having the above thickness may be formed by a slimming process. The slimming process is a process of reducing the thickness of the cover substrate 110 using a chemical or mechanical method. The slimming process may be performed on one side or both sides of a mother substrate of the cover substrate 110. When the chemical method is used, a sponge including an etching liquid may make contact with the surface of the mother substrate of the cover substrate 110, or the etching liquid may be sprayed repeatedly in a region (e.g., a predetermined region) by using a spray.

Depending on a shape of the protective cover 100, a shape of the cover substrate 110 may also change. Thus, the mother substrate of the slimed cover substrate 110 may have a variety of shapes. The shaping process may include cutting, chamfering, and/or the like.

The cover substrate 110 may include an ion-exchanged chemically strengthened layer. The chemically strengthened layer may be formed by performing a chemical strengthening treatment on an outer surface of the cover substrate 110. The chemical strengthening treatment may include an ion exchange process. The ion exchange process refers to a process by which a cation disposed at or near surface of glass at a temperature lower than a strain point of the cover substrate 110 is exchanged with another cation of the same valence. For example, alkali metal cations such as $Na^+$ and $Li^+$ inside the glass may be exchanged with cations such as $K^+$ by the ion exchange process. The ion exchange process may include the step of supporting the cover substrate 110 in an ion exchange salt and heating the supported cover substrate 110. The ion exchange salt includes ions to be exchanged with ions in the cover substrate 110. The ions included in the ion exchange salt may be $K^+$, and ions in the cover substrate 110 to be exchanged may be $Na^+$ or $Li^+$. The ion exchange salt may be in a nitrate form. When the cover substrate 110 supported in the ion exchange salt is heated, the ions in the ion exchange salt diffuse through the surface of the cover substrate 110. The cover substrate 110 may be heated at about 370° C. to about 450° C. for about 1 hour to about 6 hours.

As the chemically strengthened layer is formed on the cover substrate 110, bending rigidity of the cover substrate 110 is decreased and the cover substrate 110 and the protective cover 100 may be bent or folded more easily. The chemically strengthened layer may provide a compressive stress profile extending from a surface of the cover substrate 110 to a specific position of the substrate.

The chemical strengthening treatment may be performed on one side or both sides of the cover substrate 110. In addition, the chemical strengthening treatment may be performed symmetrically or asymmetrically on a front and back sides of the cover substrate 110. In the case where the cover substrate 110 is mainly folded in a specific direction, the chemical strengthening treatment may be performed asymmetrically. For example, in the case where the cover substrate 110 is mainly folded in only one direction, compressive stress may be induced in a surface in which both ends face each other, and tensile stress may be induced in a surface opposite to said surface. In the case where a type of stress mainly induced in both sides of the cover substrate 110 is different as described above, the chemical strengthening treatment may be performed asymmetrically.

A depth of the chemically strengthened layer may be from about 1 μm to about 15 μm. When the depth of the chemically strengthened layer is less than about 1 μm, the improvement (e.g., the increase) of the strength by chemical strengthening treatment may be insignificant. In addition, when the depth of the chemically strengthened layer is greater than about 15 μm, the stress control of the cover substrate 110 may be difficult. When the chemical strengthening treatment is performed on both the front surface and the back surface of the cover substrate 110, the thickness of the chemically strengthened layer formed on the front surface and the thickness of the chemically strengthened layer formed on the back surface may be equal to or different from each other.

The anti-scattering coating layer 120 may be provided on the cover substrate 110.

The anti-scattering coating layer 120 may be provided on the cover substrate 110 to improve (e.g., increase) impact resistance of the cover substrate 110. In addition, when the cover substrate 110 is broken by an external impact, the anti-scattering coating layer 120 can prevent or substantially prevent fragments of the cover substrate 110 from scattering. Therefore, according to the present invention, when the cover substrate 110 is broken, the user or the display device 10 is not damaged by the fragments of the cover substrate 110.

The anti-scattering coating layer 120 may include at least one selected from the group consisting of an epoxy acrylate resin, a polyester acrylate resin, a polyether acrylate resin, a urethane acrylate resin, an acryl acrylate resin, an unsaturated polyester, a urethane resin, an acrylonitrile-butadiene-styrene (ABS) resin, and rubber. The anti-scattering coating layer 120 may further include a filler such as glass beads, glass fibers, and silica in addition to compounds described above. The filler may be embedded in the anti-scattering coating layer 120, thereby improving (e.g., increasing) the impact resistance of the anti-scattering coating layer 120. The filler may be randomly dispersed or may exist in a specific pattern inside the anti-scattering coating layer 120.

The adhesive layer 130 may attach the protective cover 100 and other elements in the display device 10. In addition, the adhesive layer 130 may disperse a stress induced in the protective cover 100. For example, the adhesive layer 130 may disperse compressive stress or tensile stress induced in the cover substrate 110 when the protective cover 100 is bent or warped. In addition, the adhesive layer 130 may disperse the impact that the protective cover 100 receives from the outside.

The adhesive layer 130 may have a set or predetermined adhesion, modulus, and creep property under a condition of a room temperature (e.g., about 25° C.) and 50% humidity to prevent or substantially prevent the protective cover 100 from being peeled off from the display device 10. For example, the adhesive layer 130 may have an adhesion of at least 500 gf/in and may have a storage modulus of about 80 MPa to about 120 MPa under said condition. In addition, the creep property of the adhesive layer 130 may be about 50% to about 800%.

A range of the storage modulus of the adhesive layer 130 is a range determined or optimized to reduce the repulsive force due to the deformation of the display device 10. In addition, the creep property may be confirmed by measuring an initial deformation after pressing a constant force to the adhesive layer 130, and measuring a final deformation after maintaining the same force to the adhesive layer 130. For example, the creep property may be calculated by an equation of (final deformation−initial deformation)/initial deformation.

The adhesive layer 130 may include an optically clear adhesive (OCA), a pressure sensitive adhesive (PSA), or the like. Because an image output from the display device 10 is transmitted to the user through the adhesive layer 130, the adhesive layer 130 may be optically transparent.

The anti-scattering coating layer 120 includes a plurality of protrusions 121. The protrusions 121 may protrude from a flat portion 122 of the anti-scattering coating layer 120. According to an exemplary embodiment of the present invention, the flat portion 122 and the protrusions 121 may be formed integrally with each other. Therefore, when shear stress is induced in the anti-scattering coating layer 120, the protrusions 121 are not peeled off from the anti-scattering coating layer 120.

The protrusions 121 may be formed between the anti-scattering coating layer 120 and the adhesive layer 130. In addition, the adhesive layer 130 may fill the space between the adjacent protrusions 121. Therefore, the protrusions 121 may increase a contact area between the anti-scattering coating layer 120 and the adhesive layer 130. The protective cover 100, according to an exemplary embodiment of the present invention, may have several desirable features as the contact area between the anti-scattering coating layer 120 and the adhesive layer 130 is increased.

First, the adhesion between the anti-scattering coating layer 120 and the adhesive layer 130 may be improved (e.g., increased) as the contact area is increased. Therefore, according to an exemplary embodiment of the present invention, the anti-scattering coating layer 120 is not peeled from the adhesive layer 130 even when the protective cover 100 is folded or receives a lateral external force.

In addition, the protrusions 121 may disperse the shear stress induced in the adhesive layer 130. As described above, the adhesive layer 130 functions to disperse an impact experienced by the protective cover 100 or compressive stress and tensile stress induced in the protective cover 100 when the protective cover 100 is warped or bent. At this time, the adhesive layer 130 may disperse the impact or stress induced in the protective cover 100 in a form of the shear stress. If an excessively large shear stress is induced in the adhesive layer 130, the adhesive layer 130 may be fractured, but the protrusions 121 of the anti-scattering coating layer 120 may disperse the shear stress induced in the adhesive layer 130. In addition, the protrusions 121 may prevent or substantially prevent the adhesive layer 130 from being deformed by the shear stress. When the adhesive layer 130 is deformed, the dispersion effect of the compressive stress, the tensile stress, and the external impact by the adhesive layer 130 may be deteriorated, such that the mechanical strength of the protective cover 100 may be deteriorated. The protrusions 121 of the anti-scattering coating layer 120 may prevent or substantially prevent the mechanical strength of the protective cover 100 from be deteriorated.

The anti-scattering coating layer 120 may be formed by coating and curing a coating solution including the compound described above. For example, the anti-scattering coating layer 120 may be formed by curing the coating solution including polyester acrylate and urethane acrylate. A curing method may include ultraviolet curing, thermal curing, and/or the like. The anti-scattering coating layer 120 may be formed by coating and curing the coating solution on the cover substrate 110, or may be attached onto the cover substrate 110 after being formed by a separate process. When the anti-scattering coating layer 120 is formed directly on the cover substrate 110, a separate adhesive layer for attaching the anti-scattering coating layer 120 to the cover substrate 110 is unnecessary.

The protrusions 121 on the anti-scattering coating layer 120 may be formed by using a method such as imprinting, laser cutting, and the like. For example, the protrusions 121 may be formed by cutting off the anti-scattering coating layer 120 after forming the anti-scattering coating layer 120 on the cover substrate 110. In some examples, the protrusions 121 may be formed by coating a coating solution, and then pressing an uncured coating solution using a mold having a shape including protrusions 121 and a flat portion 122. In the case of using the laser cutting method, because there is no increase in cost due to the addition of the mold when the number or shape of the protrusions 121, the number and shape of the protrusions 121 may be freely adjusted as desired.

Referring to FIG. 1, two protrusions 121 adjacent to each other may be spaced apart by a first distance D1. Therefore, referring to FIG. 1, the protrusion 121 may be regularly arranged. As long as the protrusions 121 have a regular arrangement, the effect (e.g., the advantageous effect) of the protrusions 121 described above may appear uniformly in the entire region of the protective cover 100. According to an exemplary embodiment of the present invention, the first distance D1 may be about 5 µm to about 100 µm. As long as the first distance D1 satisfies the above range, the effect (e.g., the advantageous effect) of the protrusions 121 may appear in the entire region of the protective cover 100. Those skilled in the art may select an appropriate first distance D1 in the range in consideration of the size and height of the protrusions 121.

The cover substrate 110, the anti-scattering coating layer 120, and the adhesive layer 130 may have similar refractive index. For example, the refractive index of each of the cover substrate 110, the anti-scattering coating layer 120, and the adhesive layer 130 may have a difference of less than 0.3 from each other. Because the refractive indexes of the three layers are similar to each other, light transmitted through the protective cover 100 is relatively less refracted at an interface between the three layers. Therefore, even when the image light incident from below the protective cover 100 passes through the protective cover 100, the brightness of the image may not be deteriorated and the image may not be deformed by the refraction. In addition, because the refractive indexes of the three layers are similar to each other, the scattering or reflection of light at an interface between the three layers is also reduced. As a result, the protective cover 100 may have a high transmittance. The protective cover 100 according to an exemplary embodiment of the present invention may have a transmittance of 90% or more.

Particularly, according to an exemplary embodiment of the present invention, the decrease in brightness or the change of the shape due to the refraction at the interface between the anti-scattering coating layer 120 and the adhesive layer 130 may be prevented or reduced. The interface between the anti-scattering coating layer 120 and the adhesive layer 130 is uneven because the protrusions 121 are disposed at the interface. Therefore, light may be refracted in various directions at the interface. This light refracted in various directions may cause large decrease of visibility when the refracted light is visible to the user' eyes. According to an exemplary embodiment of the present invention, the adhesive layer 130 fills the space between the adjacent protrusions 121 and the refractive indexes of the adhesive layer 130, the protrusions 121, and the anti-scattering coating layer 120 are similar. Therefore, the decrease of the visibility and the transmittance due to the refraction of light do not occur even at the uneven interface between the anti-scattering coating layer 120 and the adhesive layer 130.

An auxiliary sheet 140 may further be provided on the cover substrate 110. The auxiliary sheet 140 may be provided on the cover substrate 110 for fingerprint prevention, decoration, and/or the like. The auxiliary sheet 140 may include an anti-fingerprint film 141 and an adhesive member 142.

Figure 2:
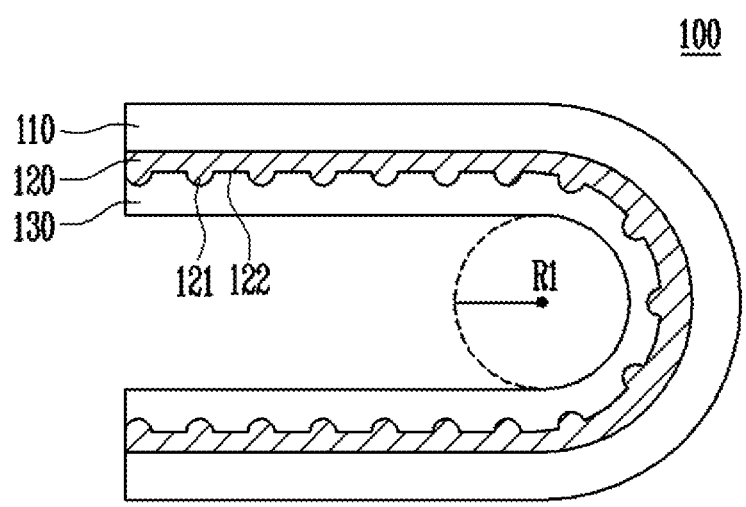
FIG. 2 is a cross-sectional view illustrating a folded state of a protective cover according to an exemplary embodiment of the present invention.

FIG. 2 is a cross-sectional view illustrating a folded state of a protective cover according to an exemplary embodiment of the present invention.

According to an exemplary embodiment of the present invention, the cover substrate 110 and anti-scattering coating layer 120 may have flexibility. Therefore, the protective cover 100 may be bent or folded as needed. In order to easily bend or fold the protective cover 100, two layers of the cover substrate 110 and the anti-scattering coating layer 120 may have a relatively small bending stiffness. In this case, the bending stiffness of each layer may be expressed by Equation 1.

$$BS \propto E \times TH^3 \qquad \text{Equation 1}$$

In Equation 1, BS represents a bending stiffness of each layer, E represents an elastic modulus of each layer, and TH represents a thickness of each layer. The bending stiffness of the cover substrate 110 is proportional to the cube of the thickness of the cover substrate 110. Therefore, in order for the cover substrate 110 to have a relatively small bending stiffness, the thickness of the cover substrate 110 should be relatively small.

As described above, in an exemplary embodiment of the present invention, the cover substrate 110 may have a thickness of about 10 µm to about 150 µm. By having a thickness in this range, the cover substrate 110 according to the present invention has a relatively small bending stiffness and may be easily bent or folded.

When the cover substrate 110 is deformed by being bent or folded, a repulsive force is generated in the cover substrate 110. The repulsive force against the deformation of the cover substrate 110 inside the protective cover 100 may be expressed by Equation 2.

$$F = \frac{wt}{6Y}\left(1.19814Y\frac{t}{D-t}\right) \qquad \text{Equation 2}$$

In equation 2, Y represents a Young's modulus, t represents a thickness of the cover substrate 110, w represents a width of the cover substrate 110, and D represents a distance between both ends of the substrate facing each other when folded. The D may substantially correspond to twice the curvature radius of the cover substrate 110. The cover substrate 110 may be set to have a curvature radius of about 1 mm to about 10 mm, and the curvature radius may satisfy the corresponding D. According to Equation 2, when other conditions are the same, the repulsive force in the case where the thickness of the cover substrate 110 is about 100 µm and D is about 10 mm is about three times the repulsive force in the case where the thickness of the cover substrate 110 is about 70 µm.

Therefore, a large repulsive force may be induced in the cover substrate 110 when the protective cover 100 is bent as shown in FIG. 2. In addition, when the thickness of the cover substrate 110 is reduced to decrease the repulsive force and the bending stiffness of the cover substrate 110, the cover substrate 110 may be vulnerable to an external impact.

The anti-scattering coating layer 120 according to an exemplary embodiment of the present invention may complement the insufficient impact resistance of the cover substrate 110 by improving (e.g., increasing) the impact resistance as described above. In addition, the anti-scattering coating layers 120 may prevent or substantially prevent fragments from scattering when the cover substrate 110 is broken due to an external impact.

The cover substrate 110 and the anti-scattering coating layer 120 according to an exemplary embodiment of the present invention may have a curvature radius of about 10 mm or less. The cover substrate 110, according to the present invention, may not be broken even with the curvature radius R1, and the anti-scattering coating layer 120 and the cover substrate 110 may not be peeled off even with the curvature radius R1. In addition, the cover substrate 110, the anti-scattering coating layer 120 according to the present invention may be folded with a curvature radius R1 of about 10 mm or less even in a hot and humid environment (e.g., about 60° C.) and a low temperature environment (e.g., about −20° C.). For example, the cover substrate 110 and the anti-scattering coating layer 120 may be folded with a curvature radius R1 of about 1 mm to about 10 mm in the environment described above. Because the protective cover 100 has this flexibility, it may be utilized in various suitable display devices.

Figure 3A:
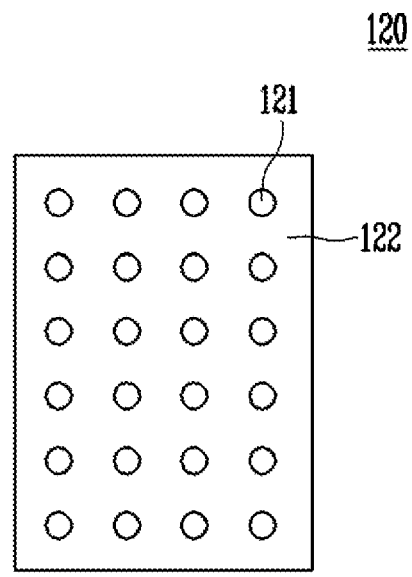
FIGS. 3A-3B are plan views of an anti-scattering coating layer according to an exemplary embodiment of the present invention.
Figure 3B:
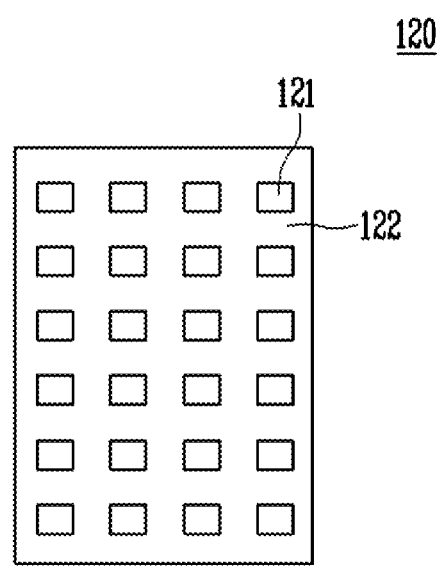
Figure 4A:
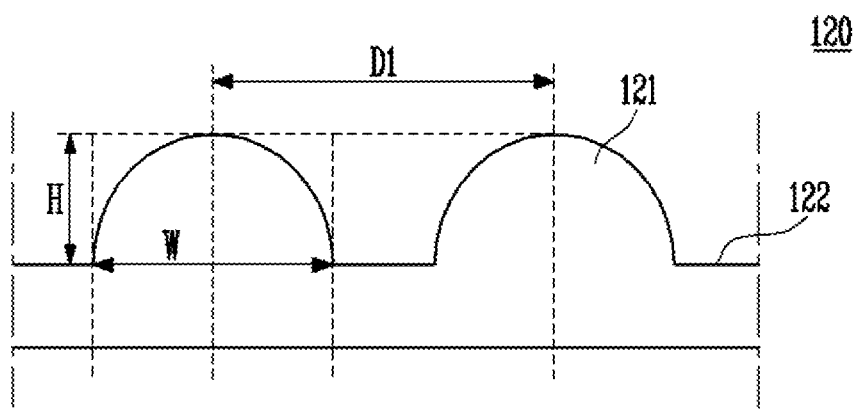
FIGS. 4A-4B are enlarged cross-sectional views of an anti-scattering coating layer according to an exemplary embodiment of the present invention.
Figure 4B:
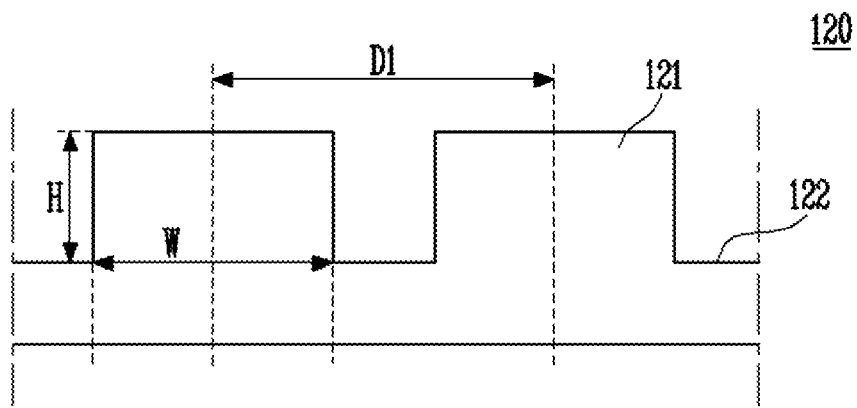

FIGS. 3A and 3B are plan views of an anti-scattering coating layer according to an exemplary embodiment of the present invention. In addition, FIGS. 4A and 4B are enlarged cross-sectional views of an anti-scattering coating layer according to an exemplary embodiment of the present invention. FIGS. 3A and 3B and FIGS. 4A and 4B are views schematically illustrating the shape of the anti-scattering coating layer 120 and the protrusions 121 for convenience of description. Therefore, the shape and the number of the protrusions 121 and the anti-scattering coating layer 120 are not limited by the above drawings.

Referring to FIGS. 3A and 3B, the protrusions 121 may be circular or quadrangular in a plane view. When viewed in three dimensions, the circular protrusions 121 shown in FIG. 3A are the protrusions 121 having the shape of a hemisphere, and the quadrangular protrusions 121 shown in FIG. 3B are the protrusions 121 having the shape of a quadrangular prism. The protrusions 121 may have various suitable shapes. The protrusions 121 may have a shape such as a cylinder, a hexagonal prism, a trapezoid, a pentagonal prism, an octagonal prism, and the like, in addition to a hemisphere or a quadrangular prism.

According to an exemplary embodiment of the present invention, the protrusions 121 may have various suitable areas. For example, each protrusion 121 may have an area in a range of 12 µm² to 10,000 µm² on a plane. The impact resistance of the protective cover 100 may be improved (e.g., increased) as a result of each protrusion 121 having an area in the above range. Referring to FIGS. 4A and 4B, the width of the protrusions 121 may change depending on the shape of the protrusions 121 even when the protrusions 121 have the same area. For example, an area of each protrusion 121 shown in FIG. 4A, is πW²/4, and an area of each protrusion 121 in FIG. 4B, is W². Therefore, even when the protrusions 121 have the same area, the width W of protrusions 121 may be different. Because the width W of the protrusions 121 affects the first distance D1, which is the distance between the adjacent protrusions 121, those skilled in the art may determine the first distance D1 in consideration of both the area and the shape of the protrusions 121.

According to an exemplary embodiment of the present invention, the height H of the protrusions 121 may be about 5 µm to about 50 µm. When the height H of the protrusions 121 is less than 5 µm, the effect of increasing the contact area between the anti-scattering coating layer 120 and the adhesive layer 130 due to the protrusions 121 may be insignificant. In addition, when the height H of the protrusions 121 is greater than 50 µm, the flexibility of the protective cover 100 may be deteriorated. As shown in FIG. 4A, when the protrusions 121 are hemispherical, the height H of the protrusions 121 are equal to the radius of the hemisphere.

According to an exemplary embodiment of the present invention, the protrusions 121 may be provided in various numbers. For example, the protrusions 121 may number 25 to 10,000 per mm² of the anti-scattering coating layer 120. When the protrusions 121 number less than 25 per mm² of the anti-scattering coating layer 120, the effect of increasing the contact area between the anti-scattering coating layer 120 and the adhesive layer 130 due to the protrusions 121 may be insufficient. In addition, when the protrusions 121 number more than 10,000 per mm² of the anti-scattering coating layer 120, the flexibility of the protective cover 100 may be deteriorated.

Figure 5:
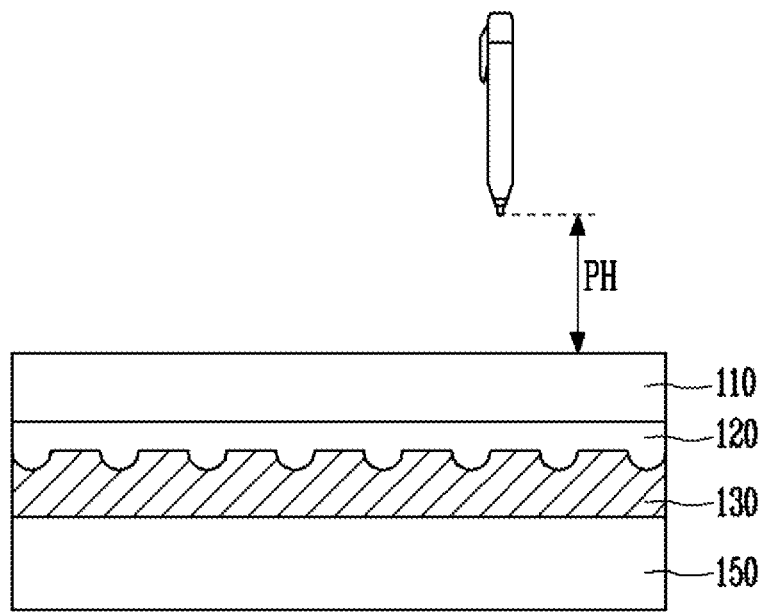
FIG. 5 illustrates a cross-section of a protective cover and a state of an impact resistance evaluation test according to an exemplary embodiment of the present invention.

FIG. 5 illustrates a cross-section of a protective cover and a state of an impact resistance evaluation test according to an exemplary embodiment of the present invention.

Referring to FIG. 5, an impact resistance evaluation test of the protective cover 100 according to an exemplary embodiment of the present invention may be performed by stacking the protective cover 100 on a module 150 and dropping a pen of about 5.7 g onto the protective cover 100. In this test, the impact resistance may be evaluated by measuring a drop height PH of the pen in which the protective cover 100 is broken. Therefore, the greater the drop height PH of the pen is, the better the impact resistance of the protective cover 100 is. This drop test of the pen is particularly useful for evaluating the resistance to a point impact. The point impact refers to the application of high pressure to a small area. The point impact may occur when the protective cover 100 is pressed by a sharp object such as a pen. The module 150 disposed under the protective cover 100 may be broken by the impact when the protective cover 100 cannot sufficiently absorb the point impact.

In the impact resistance evaluation test of FIG. 5, a plastic film may be used instead of the module 150. When the impact resistance evaluation test is performed using the actual module 200, the module 200 may be broken during the test, which causes an increase in a cost of the test. Therefore, the protective cover 100 is stacked on the plastic film similar to the module 150, and then the impact resistance evaluation test may proceed. For example, a polyethylene terephthalate (PET) film may be disposed at the position of the module 150.

Figure 6:
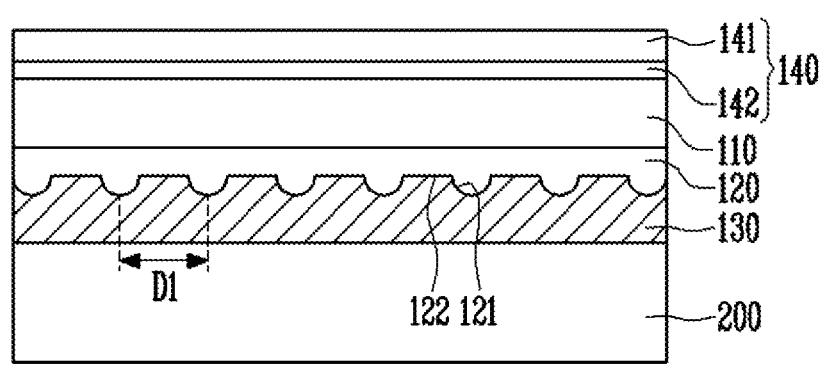
FIG. 6 is a cross-sectional view of a display device according to an exemplary embodiment of the present invention.

FIG. 6 is a cross-sectional view of a display device according to an exemplary embodiment of the present invention.

According to an exemplary embodiment of the present invention, the display device 10 may include a display panel 200 for displaying an image and a protective cover 100 provided on the display panel 200. The protective cover 100 has been described above.

The display device 10 may have flexibility. Therefore, the display device 10 may be bent, folded, or curled, and the protective cover 100 included in the display device may also be deformed.

The display device 10 according to the present invention may be implemented in various forms such as an organic light emitting device, a liquid crystal device, an electrophoretic device, and an electrowetting device. When the display device 10 according to the present invention is an organic light emitting device, the display panel 200 may include a light emitting material. In addition, when the display device 10 according to the present invention is a liquid crystal device, the display panel 200 may include a liquid crystal molecule. In this case, the display device 10 according to the present invention requires a separate light source.

The display device according to an exemplary embodiment of the present invention may include pixels provided on a display region, a gate driver and a data driver for driving the pixels, and a timing controller for controlling driving of the gate driver and the data driver.

Each pixel may include a line unit which is provided on the display region and includes a gate line, a data line, and a driving voltage line, a thin film transistor that is connected to the line unit, an organic light emitting device that is connected to the thin film transistor, and a capacitor.

The gate line may extend in one direction. The data lines may extend in another direction crossing the gate line. The driving voltage line may extend in substantially the same direction as the data line. The gate line may transfer a gate signal to the thin film transistor, the data line may transfer a data signal to the thin film transistor, and the driving voltage line may provide a driving voltage to the thin film transistor.

The thin film transistor may include a driving thin film transistor for controlling the organic light emitting device and a switching thin film transistor for switching the driving thin film transistor. However, the number of the thin film transistors is not limited thereto. One pixel may include one thin film transistor and one capacitor, or one pixel may include three or more thin film transistors and two or more capacitors.

A gate electrode of the switching thin film transistor may be connected to the gate line, and a source electrode of the switching thin film transistor may be connected to the data line. A drain electrode of the switching thin film transistor may be connected to the gate electrode of the driving thin film transistor. The switching thin film transistor may transfer a data signal applied to the data line to the driving thin film transistor based on a gate signal applied to the gate line.

A gate electrode of the driving thin film transistor may be connected to the drain electrode of the switching thin film transistor, the source electrode of the driving thin film transistor may be connected to the driving voltage line, and the drain electrode of the driving thin film transistor may be connected to the organic light emitting device.

The organic light emitting device includes a light emitting layer, and a cathode and an anode opposite to each other with the light emitting layer interposed therebetween. The cathode is connected to the drain electrode of the driving thin film transistor. A common voltage is applied to the anode, and the light emitting layer emits or does not emit light according to the output signal of the driving thin film transistor, thereby displaying an image. Herein, the light emitted from the light emitting layer may be white light or colored light.

The capacitor may be connected between the gate electrode and the second source electrode of the driving thin film transistor, and may charge and hold the data signal input to the gate electrode of the driving thin film transistor.

The timing controller receives a plurality of video signals and a plurality of control signals from the outside of the display device. The timing controller converts a data format of the video signals according to an interface specification with the data driver, and provides the converted video signals to the data driver. In addition, the timing controller generates a data control signal (e.g., an output start signal, a horizontal start signal, and the like) and a gate control signal (e.g., a vertical start signal, a vertical clock signal, and a vertical clock bar signal) based on a plurality of control signals. The data control signal is provided to the data driver, and the gate control signal is provided to the gate driver.

The gate driver sequentially outputs the gate signal in response to the gate control signal provided from the timing controller. Therefore, a plurality of pixels may be sequentially scanned, line by line, by the gate signal.

The data driver converts the video signals into data signals in response to a data control signal provided from the timing controller. The output data signals are applied to the pixels.

Therefore, each pixel is turned on by the gate signal, and the turned-on pixel receives a corresponding data voltage from the data driver, thereby displaying an image of the desired gray level.

Hereinafter, the present invention will be described in more detail through experimental results. The following exemplary embodiments were not used to limit the scope of the present invention, but merely used to explain the present invention.

Tables 1 to 3 show a result of the impact resistance evaluation of the protective cover according to Example and Comparative Example. The impact resistance evaluation is obtained by a breakage height at which the protective cover or display panel is broken when the pen of about 5.7 g is dropped onto the protective cover stacked on the display panel, as described above with reference to FIG. 5. In a test for the impact resistance evaluation, a polyethylene terephthalate (PET) film having a thickness of about 50 μm was used instead of the display panel. A chemically strengthened glass having a thickness of about 70 μm was used as the cover substrate.

Table 1 shows the result of an impact resistance evaluation for the protective cover including the protrusions having the shape of a hemisphere.

TABLE 1

| | Diameter | Height | Area | First distance | Average of breakage height | Standard deviation of breakage height |
|---|---|---|---|---|---|---|
| Example 1 | 5 μm | 2.5 μm | 19.63 μm$^2$ | 5 μm | 10.20 cm | 0.75 |
| Example 2 | 10 μm | 5 μm | 78.54 μm$^2$ | 10 μm | 10.80 cm | 0.40 |
| Example 3 | 30 μm | 15 μm | 706.86 μm$^2$ | 30 μm | 10.60 cm | 0.49 |
| Example 4 | 50 μm | 25 μm | 1963.50 μm$^2$ | 50 μm | 11.60 cm | 0.80 |
| Example 5 | 80 μm | 40 μm | 5026.55 μm$^2$ | 80 μm | 13.20 cm | 1.17 |

TABLE 1-continued

| | Diameter | Height | Area | First distance | Average of breakage height | Standard deviation of breakage height |
|---|---|---|---|---|---|---|
| Example 6 | 100 μm | 50 μm | 7853.98 μm² | 100 μm | 15.60 cm | 0.80 |

Table 2 shows the result of an impact resistance evaluation for the protective cover including the protrusions having the shape of a square prism.

TABLE 2

| | Diameter | Height | Area | First distance | Average of breakage height | Standard deviation of breakage height |
|---|---|---|---|---|---|---|
| Example 7 | 5 μm | 5 μm | 25 μm² | 5 μm | 10.40 cm | 0.80 |
| Example 8 | 30 μm | 5 μm | 900 μm² | 10 μm | 11.00 cm | 0.89 |
| Example 9 | 30 μm | 10 μm | 900 μm² | 10 μm | 10.80 cm | 1.17 |
| Example 10 | 30 μm | 5 μm | 900 μm² | 30 μm | 11.20 cm | 0.75 |
| Example 11 | 30 μm | 10 μm | 900 μm² | 30 μm | 11.00 cm | 0.63 |
| Example 12 | 50 μm | 10 μm | 2500 μm² | 10 μm | 11.60 cm | 1.02 |
| Example 13 | 50 μm | 20 μm | 2500 μm² | 50 μm | 11.80 cm | 0.75 |
| Example 14 | 50 μm | 10 μm | 2500 μm² | 10 μm | 12.40 cm | 0.80 |
| Example 15 | 50 μm | 20 μm | 2500 μm² | 50 μm | 13.20 cm | 0.98 |
| Example 16 | 100 μm | 30 μm | 10000 μm² | 5 μm | 13.40 cm | 1.49 |
| Example 17 | 100 μm | 50 μm | 10000 μm² | 50 μm | 13.20 cm | 1.60 |
| Example 18 | 100 μm | 30 μm | 10000 μm² | 100 μm | 13.00 cm | 1.79 |

Table 3 shows the result of an impact resistance evaluation for the protective cover according to Comparative Example. Comparative Example 1 is the result of an impact resistance evaluation for a chemically strengthened glass having a thickness of about 70 μm. In addition, Comparative Example 2 is the result of an impact resistance evaluation for the protective cover which stacks the anti-scattering coating layer having a thickness of about 30 μm on a chemically strengthened glass having a thickness of about 40 μm. The anti-scattering coating layer of Comparative Example 2 has no protrusions.

TABLE 3

| | Thickness of glass | Thickness of anti-scattering coating layer | Average of breakage height |
|---|---|---|---|
| Comparative Example 1 | 70 μm | — | 4 cm |
| Comparative Example 2 | 40 μm | 30 μm | 1.5 cm |

Referring to Tables 1 to 3, it may be confirmed that the protective cover of Example has much better impact resistance than the protective cover of the Comparative Example.

When Table 1 and Table 2 are compared, the difference in an impact resistance between the case where the protective cover includes the protrusions having the shape of a hemisphere and the case where the protective cover includes the protrusions having the shape of a square prism is insignificant. Therefore, it may be confirmed that the shape of the protrusions does not greatly affect the impact resistance of the protective cover. On the other hand, it may be confirmed that the height, width, and first distance of the protrusions affect the impact resistance of the protective cover. In particular, as shown in Examples 14 to 18, it may be confirmed that it is desirable to find a combination of the height, width, and first distance of the protrusions that can increase or maximize the improvement of the impact resistance.

The protective cover according to an exemplary embodiment of the present invention may be applied to various suitable electronic devices. For example, the protective cover may be applied to a television, a notebook, a mobile phone, a smart phone, a smart pad, a PMP, a PDA, a navigation device, various wearable devices such as a smart watch, and the like.

The terms, 'first', 'second' and the like may be simply used for description of various constituent elements, but those meanings may not be limited to the restricted meanings. The above terms are used only for distinguishing one constituent element from other constituent elements. For example, a first constituent element may be referred to as a second constituent element and similarly, the second constituent element may be referred to as the first constituent element within the scope of the appended claims. When explaining the singular, unless explicitly described to the contrary, it may be interpreted as the plural meaning.

In the present specification, the terms 'upper side' and 'lower side' are used in a relative sense in order to facilitate understanding of the technical idea of the present invention. Thus, the terms 'upper side' and 'lower side' do not refer to a particular direction, position, or element, and are interchangeable. For example, 'upper side' may be interpreted as 'lower side', and 'lower side' may be interpreted as 'upper side'. Therefore, 'upper side' may be expressed as 'first side', 'lower side' may be expressed as 'second side', 'lower side' may be expressed as 'first side', and 'upper side' may be expressed as 'second side'. However, in one exemplary embodiment, 'upper side' and 'lower side' are not mixed.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration. In addition, it will be understood that when an element such as a layer, film, region, or substrate is referred to as being "on" another element, it can be directly on the other element or intervening elements may also be present. In the specification, it will be understood that when an element such as a layer, film, region, or substrate is referred to as being disposed "on" another element, the disposed direction is not limited to an upper direction and include a side direction or a lower direction. In contrast, It will be understood that when an element such as a layer, film, region, or substrate is referred to as being "beneath" another element, it can be directly beneath the other element or intervening elements may also be present.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", or "immediately adjacent" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art. Further, a specific quantity or range recited in this written description or the claims may also encompass the inherent variations in measured or calculated values that would be recognized by those of ordinary skill in the art.

As used herein, the terms "use," "using," and "used" may be considered synonymous with the terms "utilize," "utilizing," and "utilized," respectively.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification. While the present invention has been shown and described with reference to certain exemplary embodiments thereof, it will be understood by those skilled in the art that various changes in forms and details may be made therein without departing from the spirit and scope of the present invention as defined by the appended claims and their equivalents.

What is claimed is:

1. A display device comprising:
    a display panel configured to display an image; and
    a protective cover on the display panel,
    wherein the protective cover comprises:
        a cover substrate;
        an anti-scattering coating layer on the cover substrate; and
        an adhesive layer on the anti-scattering coating layer,
        wherein the anti-scattering coating layer has a plurality of protrusions protruding toward the display panel,
        wherein the cover substrate has a thickness of 10 μm to 150 μm, and
        wherein the cover substrate and the anti-scattering coating layer are configured to be folded with a curvature radius of 10 mm or less.

2. The display device of claim 1, wherein the adhesive layer is disposed between the anti-scattering coating layer and the display panel.

3. The display device of claim 1, wherein the display device is configured to be folded with a curvature radius.

4. The display device of claim 1, wherein each of the protrusions has an area of 12 μm² to 10,000 μm² on a plane.

5. The display device of claim 1, wherein the protrusions number 25 to 10,000 per 1 mm² of the anti-scattering coating layer.

* * * * *